US006691891B2

(12) United States Patent
Maldonado

(10) Patent No.: US 6,691,891 B2
(45) Date of Patent: Feb. 17, 2004

(54) ADJUSTABLE PUSH FORWARD DISPENSING MECHANISM

(76) Inventor: Alexandre Maldonado, 8211 W. Browand Blvd. Suite #350, Plantation, FL (US) 33324

(*) Notice: Subject to any disclaimer, the term of this patent is extended or adjusted under 35 U.S.C. 154(b) by 73 days.

(21) Appl. No.: 10/161,801

(22) Filed: Jun. 4, 2002

(65) Prior Publication Data

US 2003/0000956 A1 Jan. 2, 2003

Related U.S. Application Data

(63) Continuation-in-part of application No. 09/766,720, filed on Jan. 22, 2001, now abandoned.

(30) Foreign Application Priority Data

May 22, 2000 (BR) .......................................... 8001070 U

(51) Int. Cl.[7] ................................................ B65G 59/00
(52) U.S. Cl. ....................................... 221/279; 211/59.3
(58) Field of Search ................................. 221/124, 129, 221/279, 271, 289; 211/59.3, 59.2, 51

(56) References Cited

U.S. PATENT DOCUMENTS 6,382,431 B1 * 5/2002 Burke ....................... 211/59.3
2003/0010732 A1 * 1/2003 Burke ....................... 211/59.3

* cited by examiner

*Primary Examiner*—Kenneth W. Noland

(57) ABSTRACT

An automatic product advance mechanism for dispensing merchandise on vending machines shelves is presented. A combination of electronic and mechanical components enables the disclosed system to automatically adjust for dispensing different product packaging formats and dimensions. Protected by a front clear gate-shield the products are loaded on an upright position on top of a base-rack, escorted by interchangeable column dividers and supported by a sliding carrier back-sled. The system operates by energizing a gear motor pivot ably connected to a crank-slider mechanism driving eccentrically a ratcheting pawl assembly that pushes the carrier back-sled towards the front end of said base-rack and simultaneously opens the clear gate-shield until the first product loaded to the furthermost position is dispensed. On its downfall trajectory the product passes through an optical sensor beam that signals the system electronic interface board to immediately reverse direction of the gear motor revolution returning the mechanism to its home and rest position simultaneously closing the clear gate-shield and preventing the next product to fall.

17 Claims, 13 Drawing Sheets

ADJUSTABLE PUSH FORWARD DISPENSING MECHANISM

This is a continuation-in-part of U.S. patent application Ser. No. 09/766,720 filed on Jan. 22, 2001 now abandoned.

BACKGROUND DESCRIPTION

1. Field of the Invention

The present invention relates to an automatic product advance mechanism for dispensing single merchandise on vending machines. In particular, the disclosed mechanism is designed to custom fit on a variety of glass-front vending machines shelves and or to be incorporated on new models as well. The novel system has its main concern aimed towards increasing product capacity and selections per shelf.

2. Prior Art

Many different mechanism systems are utilized to dispense and vend merchandise in automatic devices known as vending machines. The prior art dispensing mechanism works utilizing physical dividers or spacers to separate and hold packages to be dispensed, therefore lacking the need for maximizing the amount of shelf space which can be useful to increase product storage and exposure.

The most common used mechanism, U.S. Pat. No. 0,406, 1245 discloses a helical coil dispensing apparatus that accommodates products in between coils to be dispensed when rotated, but has its downside considering that the spaces between coils are given (according to the number of coils) and the coil itself both accumulates space that could be useful. Another disadvantage of the coil system is the need to replace different coils counts according to the dimension of the package been stored not to mention that most machines using this system are limit up to 10 column-selections per shelf maximum.

Hence it is the object of this invention to provide a novel and universal mechanism dispensing system that features more products vend capacity and more selections per shelf. Another important objective of this invention is to provide total flexibility allowing this new dispensing mechanism to be assembled in the majority of new and already existing vending machines shelves.

BRIEF SUMMARY OF THE INVENTION

This present invention achieves its objectives by eliminating physical spacers or most air space in between products allowing more room to accommodate merchandise therefore offering more product storage and vending capacity. The same unit is capable of dispensing a variety of different packages (boxes, bags, etc . . . ) sizes without having to be replaced. Other advantage is the flexibility provided from the interchangeable wall dividers that allows one to increase or decrease the number of columns according to the desire planogram. The disclosed system allows a maximum of 20 columns on a single vending machine shelf by splitting the base-rack into two columns wherein the present system described functions with the two actuator ratchets and two sliding carrier back-sled on one single base-rack unit, and are independently operated by two crank-slider mechanism sets, one installed underneath the base-rack driving one of the ratchets and the other placed on top of the base-rack operating the other ratchet.

Other advantages such as easy loading of merchandise are effective features related to increment cost effectiveness and operability. The merchandise sliding carrier back-sled is retractable by a simple one-handed maneuver. Utilizing plastic material on molding injection process and extrusion, the mechanism is long term resistant and manufacture at very low cost.

The present invention has the flexibility to be installed on most conventional glass front type vending machines shelves.

As shown on the embodiment of the present invention, a base-rack means to allocate a row of products that are escorted by two adjacent interchangeable column dividers and supported on an upright position by a sliding carrier back-sled means to push towards the front of the base-rack with the purpose of been individually dispensed operated by the following described mechanism system.

A shaft mounted to the bore of a gear motor is fastened to a pivot point on a crank-slider mechanism. Once the motor is energized the crank leverage arm rotates eccentrically having one end opposite from the axis pivot ably connected to an extended linkage arm. The linkage arm opposite end from the one mounted to the crank leverage arm is than pivoted to a slider that is fastened to one or two actuator ratchets. The actuator ratchet slides back and forth guided by a rail running internally and longitudinally along the base-rack driven by the rotation of the crank-slider mechanism. The center position of the pivot point on the crank leverage arm added to the length of the linkage arm determines the maximum distance the actuator ratchet will advance along the guided rail along the base-rack. The maximum stroke of the actuator ratchet is equivalent to two times the distance measured between the center point of the crank leverage arm and the pivot point where the shaft from the gear motor is fastened, added to the length of the linkage arm equally or less longer than the whole length of the crank leverage arm on the crank-slider mechanism.

The home or rest position of the mechanism is when the actuator ratchet is set by positioning the crank-slider mechanism with the shaft pivot point facing towards the front (50) of the base-rack resting the actuator ratchet all the way towards the back (54). A clear material placed at the front end of the base-rack and leveled upwardly and oblique to the products loaded means to function as a gate-shield to prevent the first product to fall off when the system is on the rest position. The clear gate-shield is fastened at the front end of one column divider adjacent to the base-rack. On the back of the base-rack a bracket connects the same column divider to the closest ratchet enabling the column divider to slide back and forth along with the actuator ratchet. The crank-slider mechanism rotates eccentrically activated by the gear motor and pushes the actuator ratchet that simultaneously slides the column divider advancing the clear gate-shield accordingly to the distance equivalent to the ratchet stroke. During the previous described cycle, a pawl pivot ably placed on the back of the sliding carrier back-sled engages by gravity to one of the teeth of the actuator ratchet enabling the sliding carrier back-sled to advance along pushing forward the products loaded on the base-rack until the first product located to the furthermost end of the base-rack or at the chute position is dispensed. On the downfall trajectory the product passes through an optical sensor that shoots a beam perpendicular with the front of the base-rack, sending a signal to an interface circuit board programmed to reverse the direction of the gear motor revolution enabling the ratchet to return to its home position and immediately driving back the column divider closing the gate-shield and avoiding the sliding carrier back-sled to further advance and drop the next product loaded. The combination of electronic and mechanical applications of the disclosed invention enables the novel dispensing system to automatically adjust according to the tick ness of each package been vended. The operation of the entire mechanism is ceased when during the system reverse cycle the ratchet is pulled back to the rest position reaching the previous starting point where a limit switch built inside the gear motor is then actuated. Once the ratchet is been driven backwards, the sliding carrier back-sled is retained on the last position due to the friction on the feet of the latter with the rail on the base-rack leaving the next product to be delivered on the chute position.

The nature, utility and principle of the present invention will be more clearly understood from the following detailed description thereof when read with reference to the accompanying drawings.

DETAILED DESCRIPTION OF THE INVENTION

This is a Continuation-in-Part of U.S. patent application Ser. No. 09/766,720.

The present invention title as Adjustable Push Forward Dispensing Mechanism comprises of one base-rack (10) one attached front-unit (50) two actuator ratchets (20), two sliding support carrier back-sled (30), with one pawl each (36), a crank-slider mechanism (70), a gear motor (90), a motor-bracket (80), a clear gate-shield (60), an interchangeable wall divider (40, 41), a bracket to connect with dividers (100), an optical sensor (130), an interface circuit board.

DESCRIPTION OF THE PREFERRED EMBODIMENTS

Figure 1:
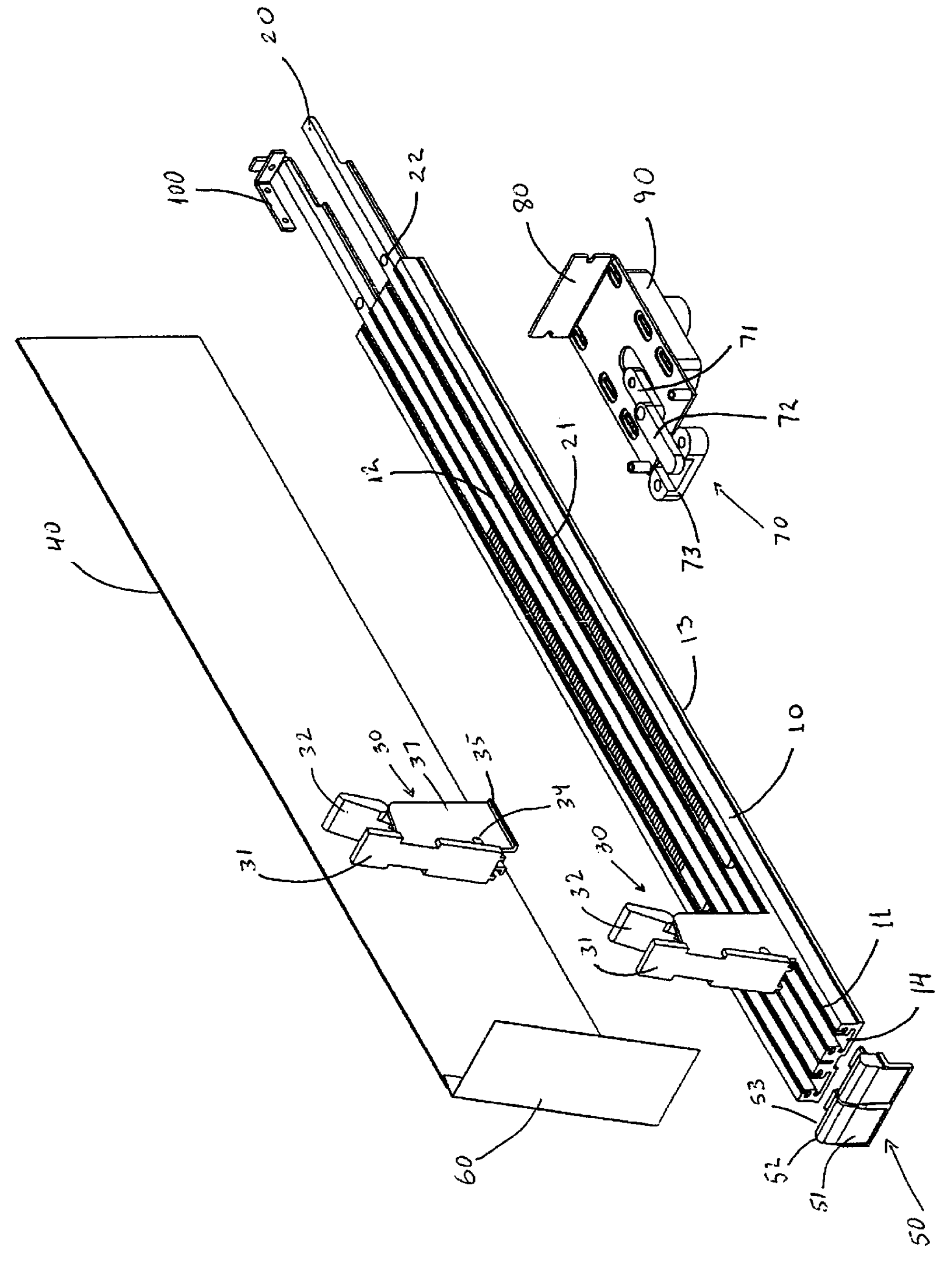
FIG. 1 is an exploded view, of a first embodiment of the automatic product advance mechanism for dispensing merchandise on vending machines in accordance with the disclosed invention.
Figure 2:
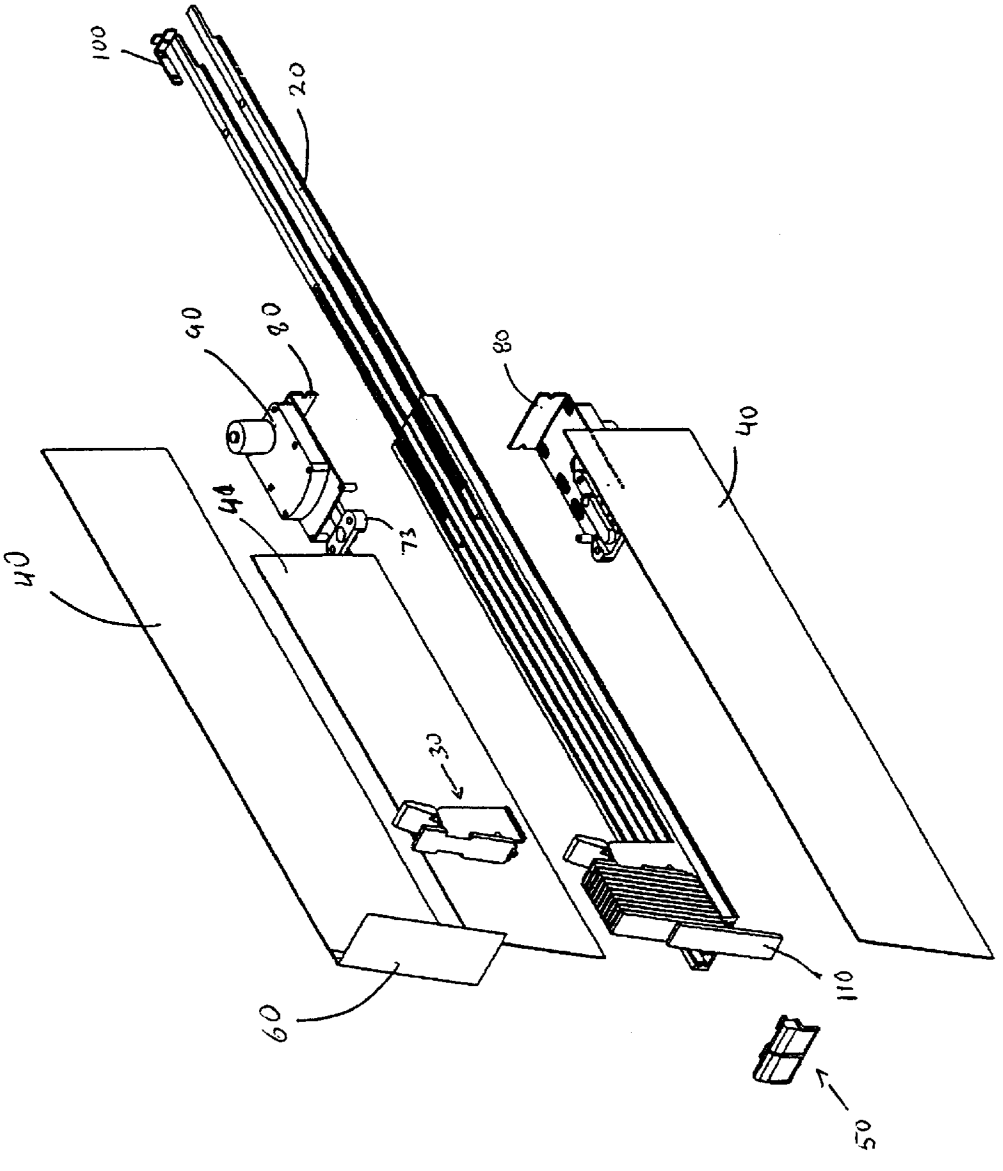
FIG. 2 is an exploded view, of a second embodiment of the automatic product advance mechanism for dispensing merchandise on vending machines of FIG. 1, showing the additional parts necessary to work as two columns in accordance with the disclose invention, and also with packages of products shown in phantom.
Figure 3:
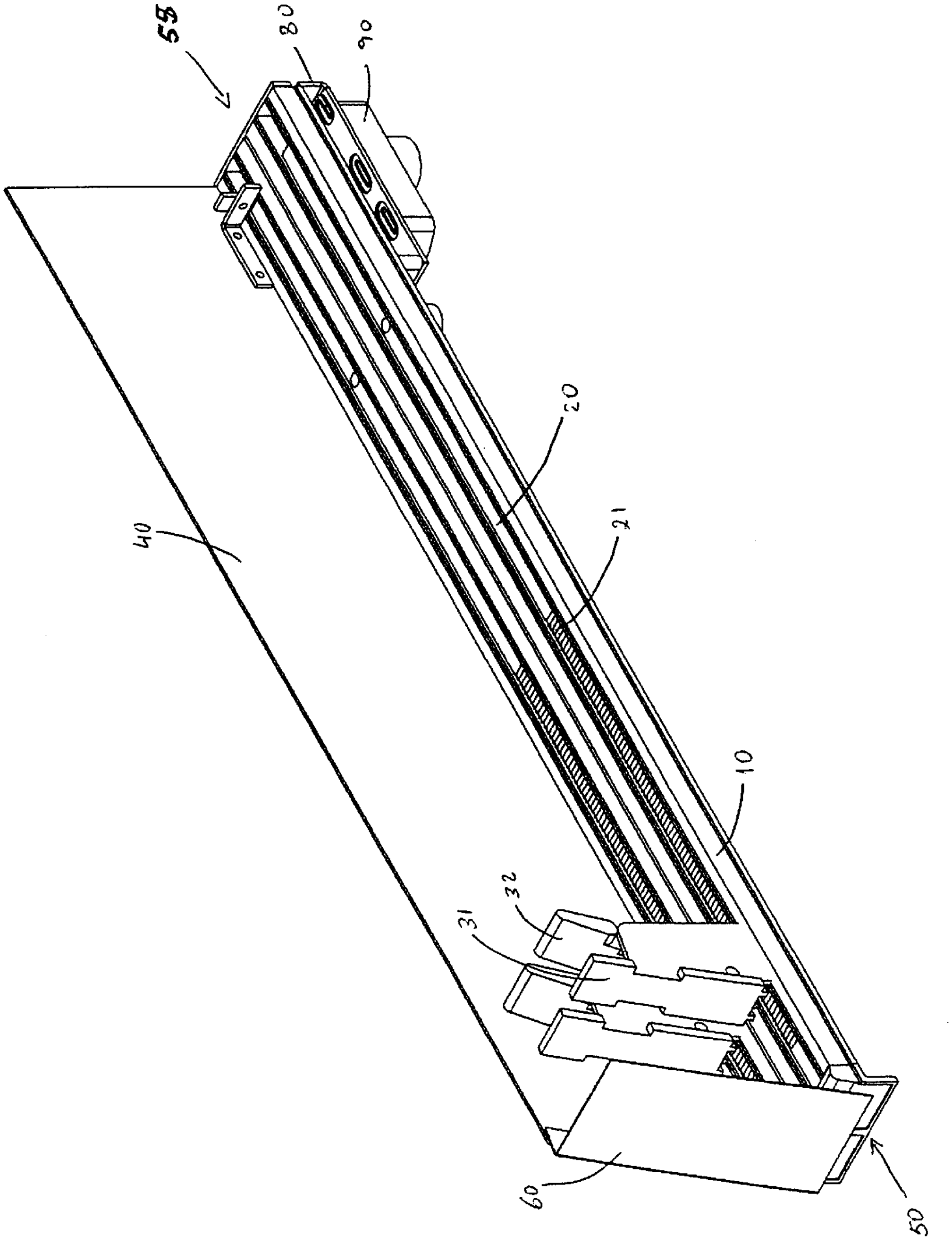
FIG. 3 is a perspective view of the automatic product advance mechanism for dispensing merchandise on vending machines of FIG. 1 assembled in accordance with the disclosed invention.

An automatic product advance mechanism for dispensing merchandise on vending machines, according to a first and second embodiment of the disclosed invention, is illustrated in FIGS. 1–7, and 13. A base-rack 10 receive a row of products that are supported by a carrier back-sled 30 and secure towards the front end 50 by a clear gate-shield 60. The base-rack 10 an extrude piece presents two internal channels 14 extending across from front 60 to back 54 of base-rack 10 to receive on each channel 14 one actuator ratchet 20 to slide back and forth along the base-rack 10. An adjacent thin column divider 40 or 41 is fastened to the actuator ratchet 20 using a bracket 100 placed on the back 54 of the actuator ratchet 20. The column divider 40 is positioned upwardly and longitudinal to base-rack 10 on top of a side step-rail 13. The column divider 41 is positioned upwardly and longitudinal to base-rack 10 on top of a middle groove 12. The column dividers 40 and 41 or interchangeable according to the width of the packages of products 100 loaded on top of base-rack 10. The clear gate-shield 60 is mounted and positioned at a right angle or perpendicular to column dividers 40 or 41, means to slide along columns dividers 40 or 41 with the stroke of the actuator ratchet 20 opening and closing gate-shield 60.

The support carrier back-sled 30 slides inside the groove 11 from front unit 50 to back 54 of the base-rack 10 to advance and push products towards the front-end unit 50 of the base-rack 10 until the first package 110 falls off from the base-rack 10.

Figure 6:
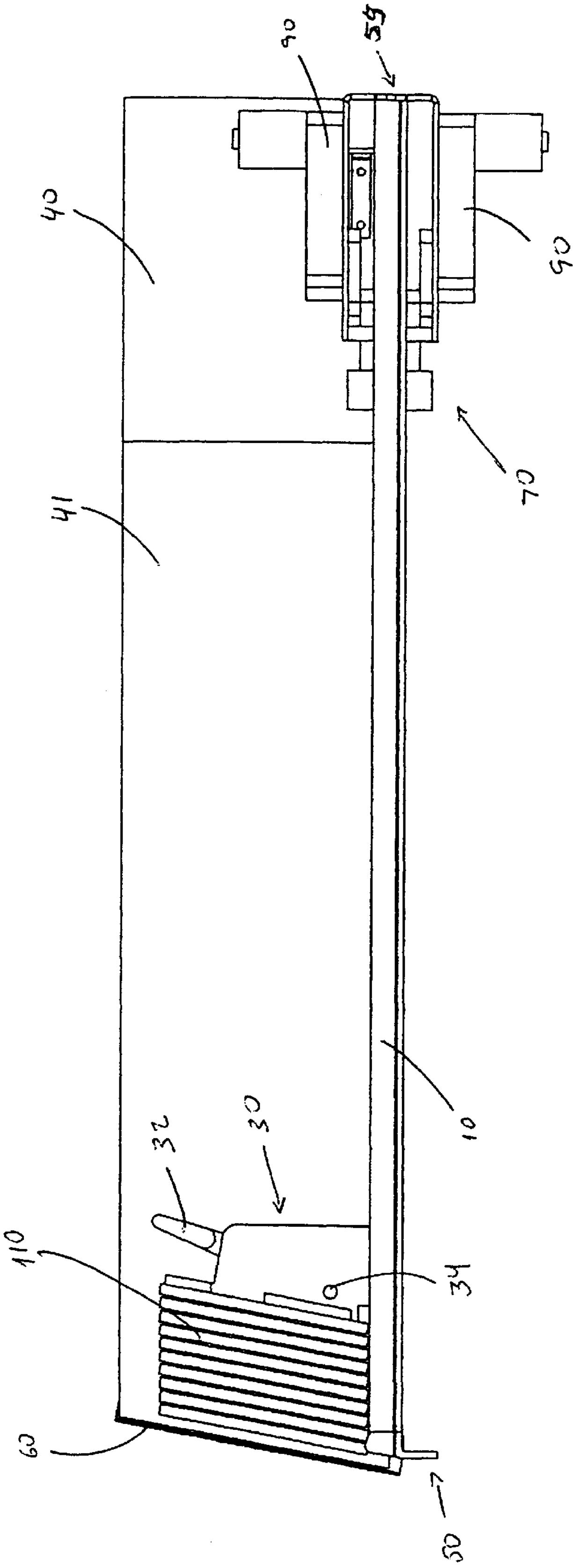
FIG. 6 is a side view of the automatic product advance mechanism for dispensing merchandise on vending machines of FIG. 3 in accordance with the disclosed invention, with packages of products shown in phantom.

FIG. 6 illustrates the dispensing mechanism on its home position where gate-shield 60 is closed securing products 100 from falling of base-rack 10 inadvertently.

Figure 7:
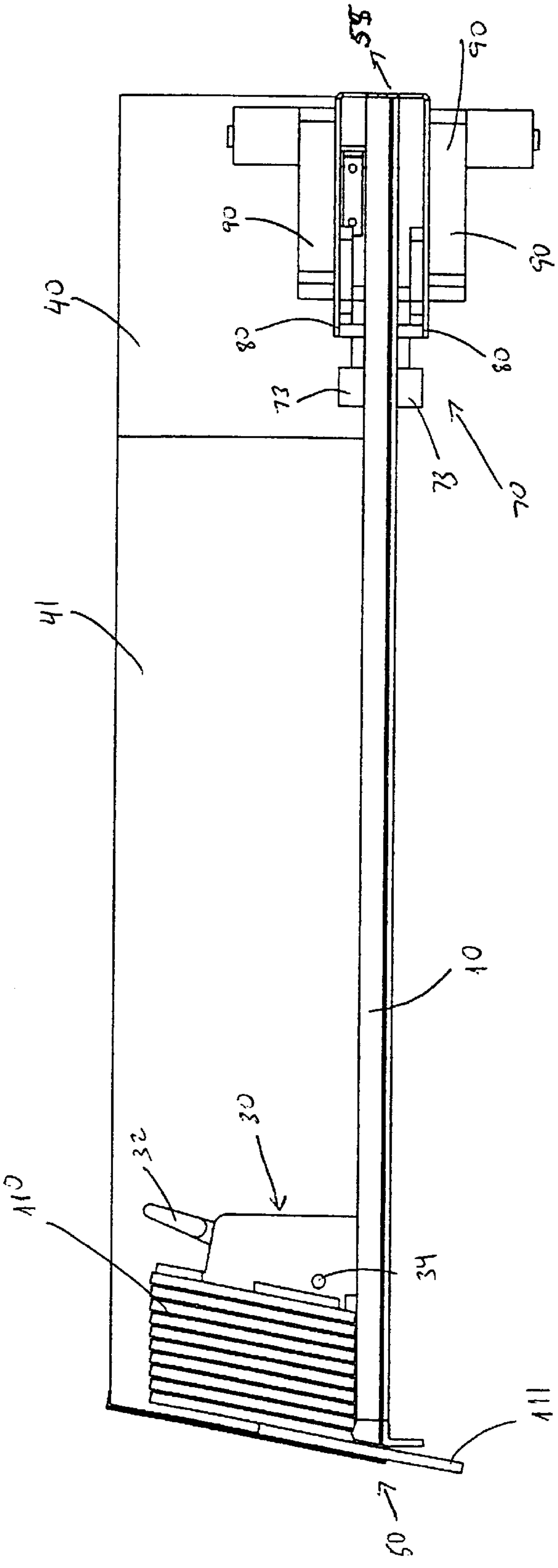
FIG. 7 is a side view of the automatic product advance mechanism for dispensing merchandise on vending machines of FIG. 4 in accordance with the disclosed invention, with packages of products shown in phantom simulating first package been dispensed.

FIG. 7 shows a product 110 falling off from base-rack 10 an immediately passing through an optical sensor beam 130 that sends a signal to the interface circuit board to instantly reverse direction of gear motor 90 and return actuator ratchet 20 towards the back 54 of base-rack 10 and closing gate-shield 60 in accordance to FIG. 6 of the disclosed invention.

Figure 5:
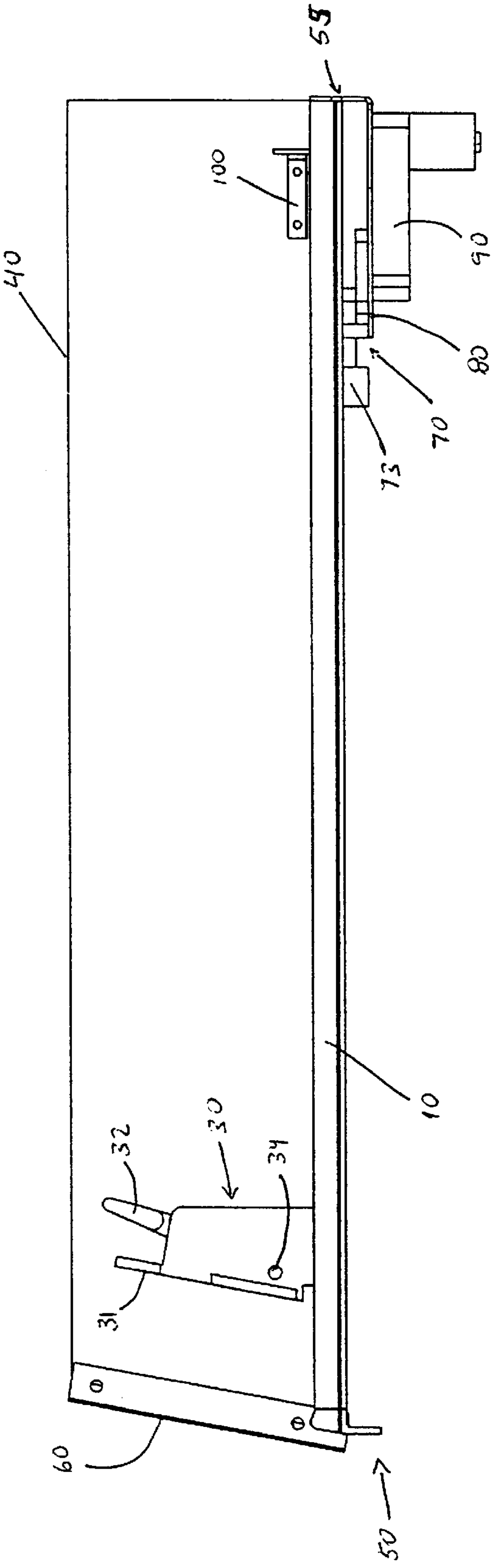
FIG. 5 is a side view of the automatic product advance mechanism for dispensing merchandise on vending machines of FIG. 3 in accordance with the disclosed invention.
Figure 11:
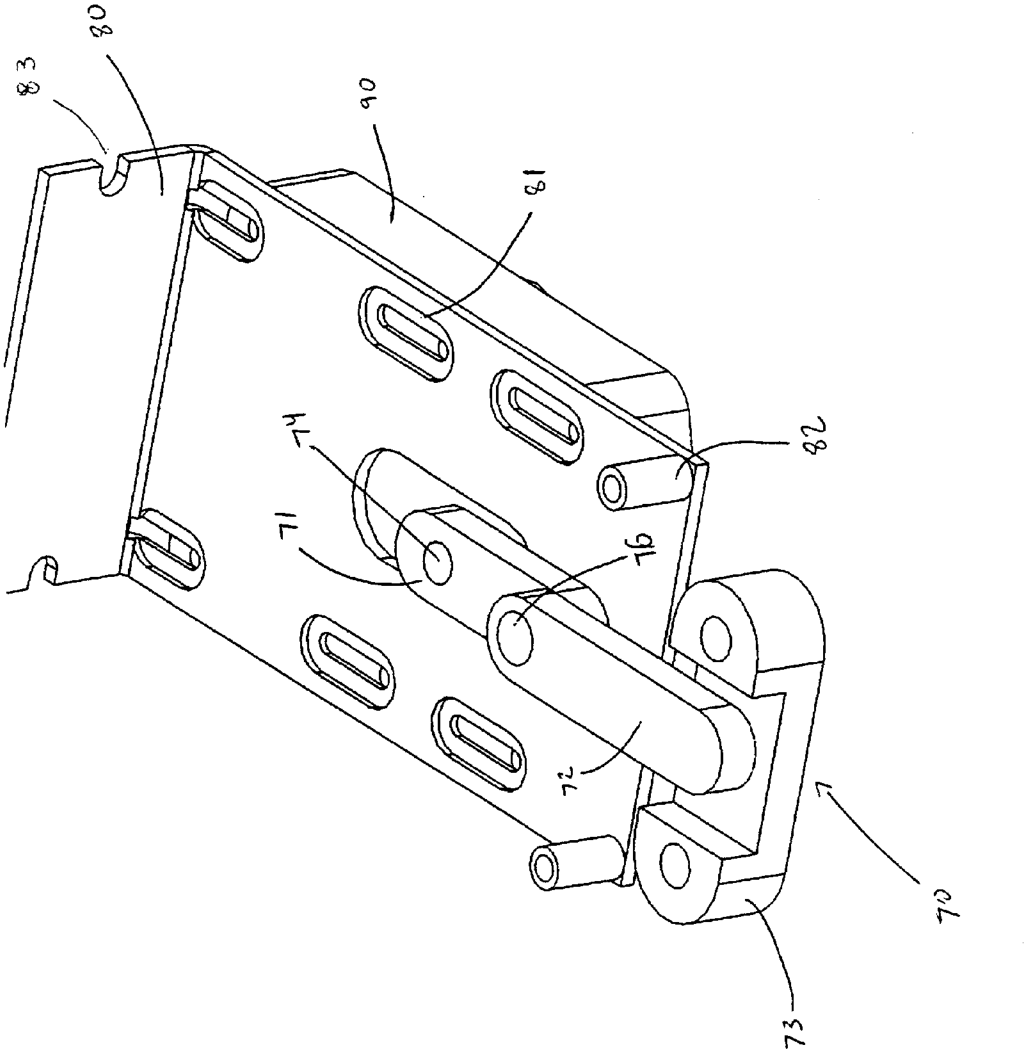
FIG. 11 is a perspective view of a fourth embodiment of the automatic product advance mechanism for dispensing merchandise on vending machines in accordance to the disclosed invention.
Figure 12:
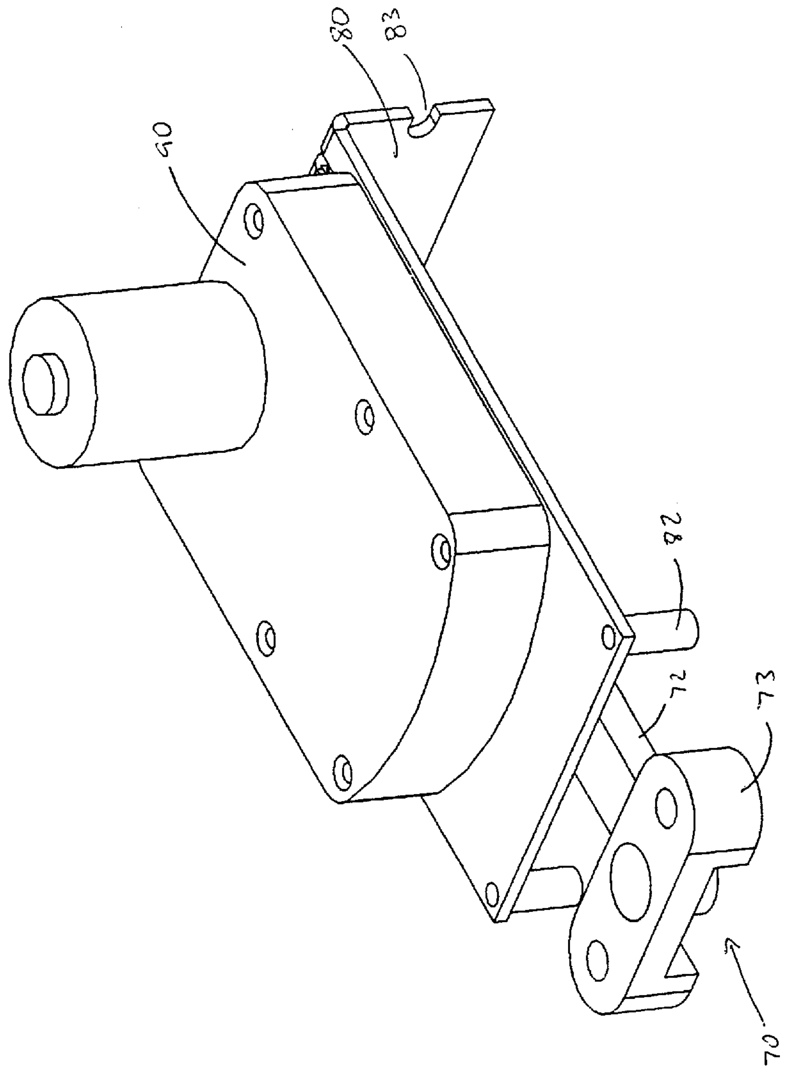
FIG. 12 is a perspective view of FIG. 11 shown in a different angle.

The stroke of the actuator ratchet 20 is driven by a crank-slider mechanism 70 as shown in FIGS. 5–7, and on FIGS. 11 and 12 a fourth embodiment of the disclosed invention. The crank leverage arm 71 is pivot ably mounted to a gear motor 90 joint by a shaft 74 that when activated rotates eccentrically the crank leverage arm 71 pivot ably attached to a linkage arm 72 that drives a slider 73 fastened to the actuator ratchet 20 into hole 22. The gear motor 90 is mounted to a bracket 80 fastened by a nut and bolt that passes through hole 81, and bracket 80 is fastened on base-rack 10 passing self-tapping screws through openings 83 and spacers 82 as shown in FIG. 11.

Figure 4:
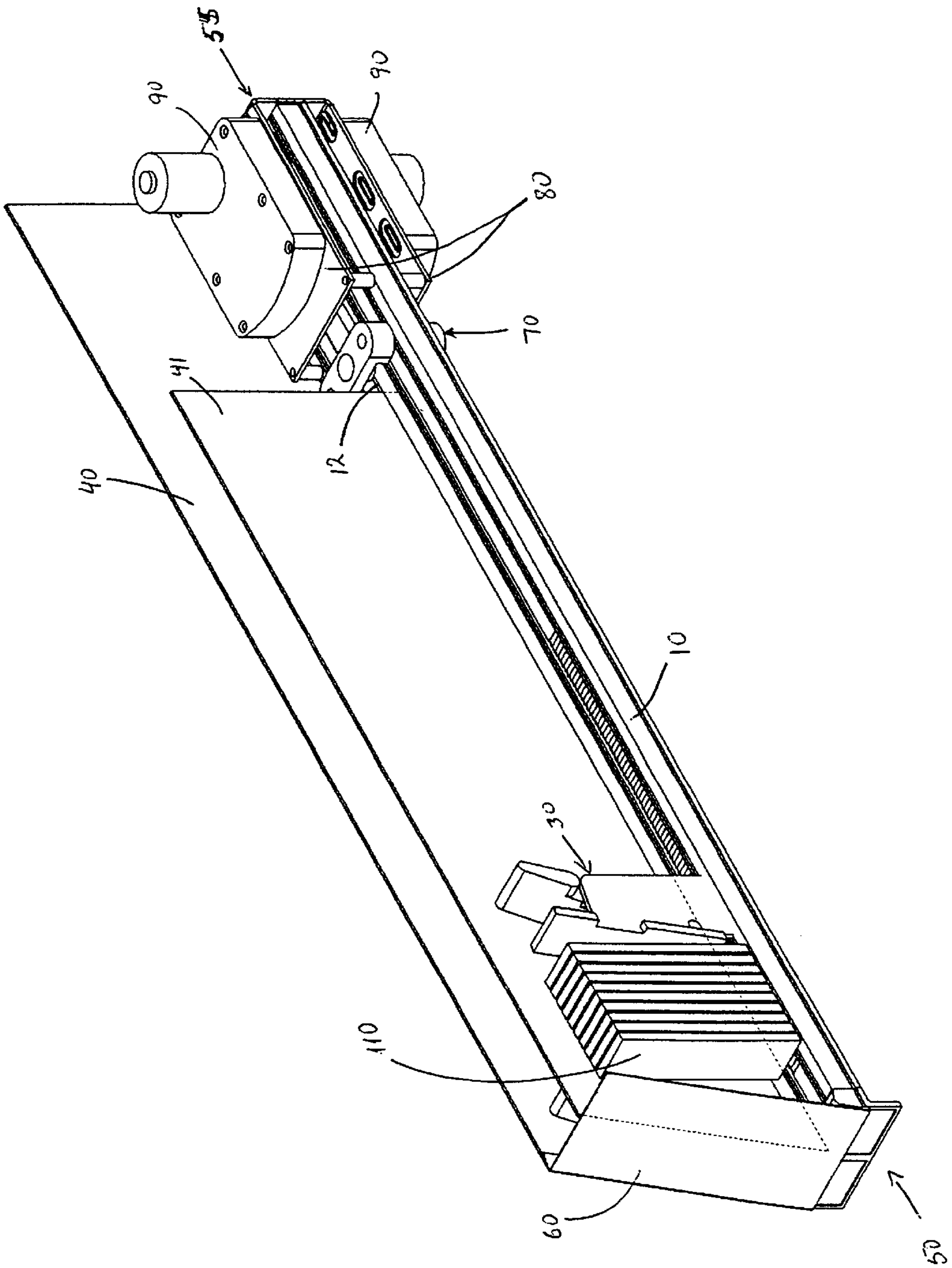
FIG. 4 is a perspective view of the automatic product advance mechanism for dispensing merchandise on vending machines of FIG. 2 assembled in accordance with the disclosed invention, with packages of products shown in phantom.

FIG. 4 shows the column divider 41 positioned in the middle groove 12 on the base-rack 10 splitting the base-rack 10 into two columns to load and vend packages of products 100 on each side of base-rack 10.

Figure 8:
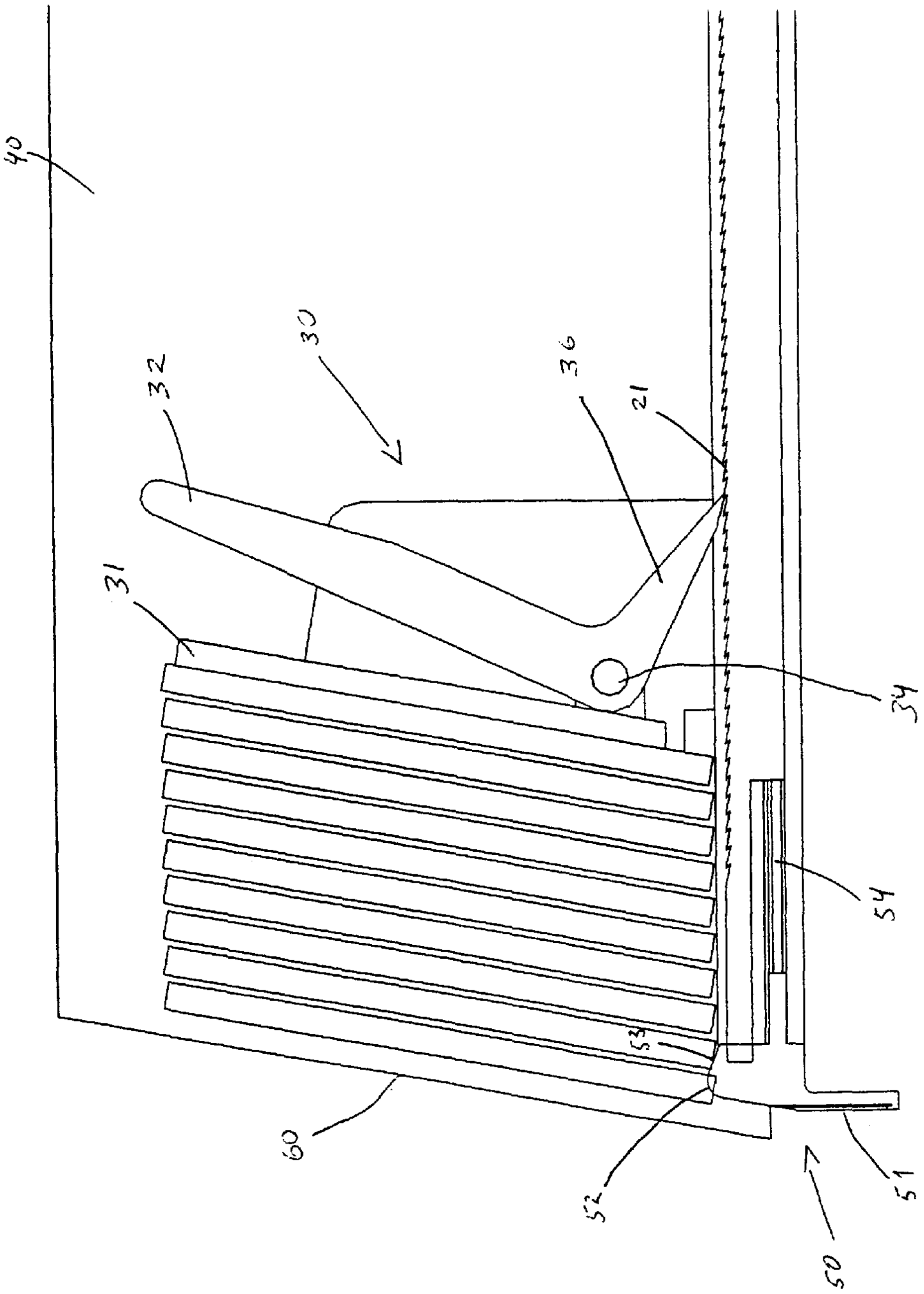
FIG. 8 is a section view, partially broken, taken from FIG. 6 with packages of products shown in phantom.
Figure 9:
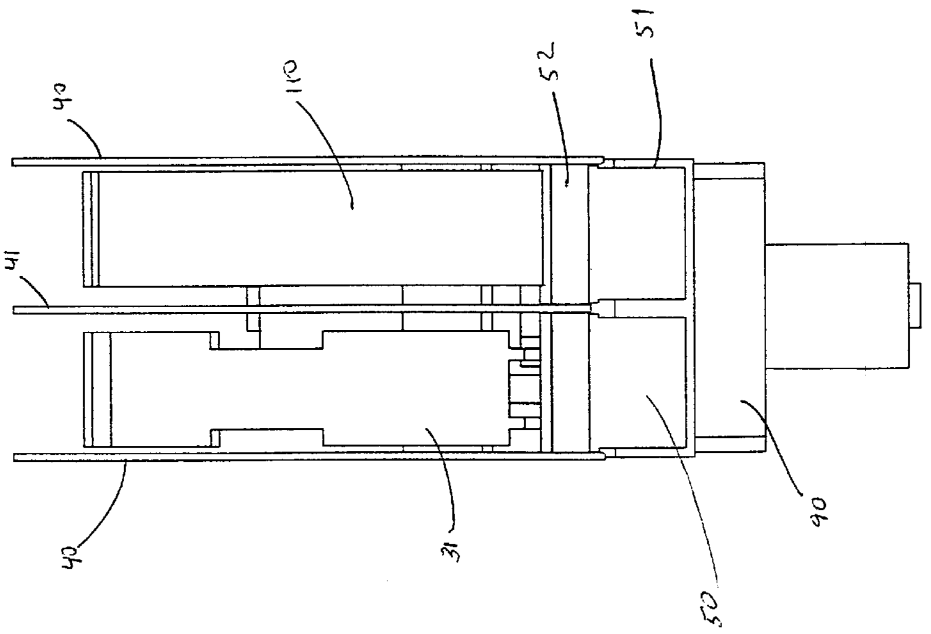
FIG. 9 is a front elevation view of the automatic product advance mechanism for dispensing merchandise on vending machines of FIG. 6 with package shown in phantom.

FIG. 8 shows front-end unit 50 attached to base-rack 10 inserted into the channel 14 through an extended pin 54. The front-end unit 50 is a plastic injected part used to provide the dispensing mechanism a finished appearance, to receive and display labels affixed on slot 51, and to ease the downfall of product 110 by the combination of ramp 53 with immediate droop 52. Ramp 53 functions as a back-stop for the second product 100, when placed on the chute position, after product 110 is dispensed until gate-shield 60 closes driven by the return cycle of actuator ratchet 20 towards the back 54 of base-rack 10. When actuator ratchets 20 moves backwards, support carrier back-sled 30 is retained on its last position due to the disengagement of pawl 36 to teeth 21 of actuator ratchet 20 and the friction caused by base 35 on groove II better shown on FIG. 10.

Figure 10:
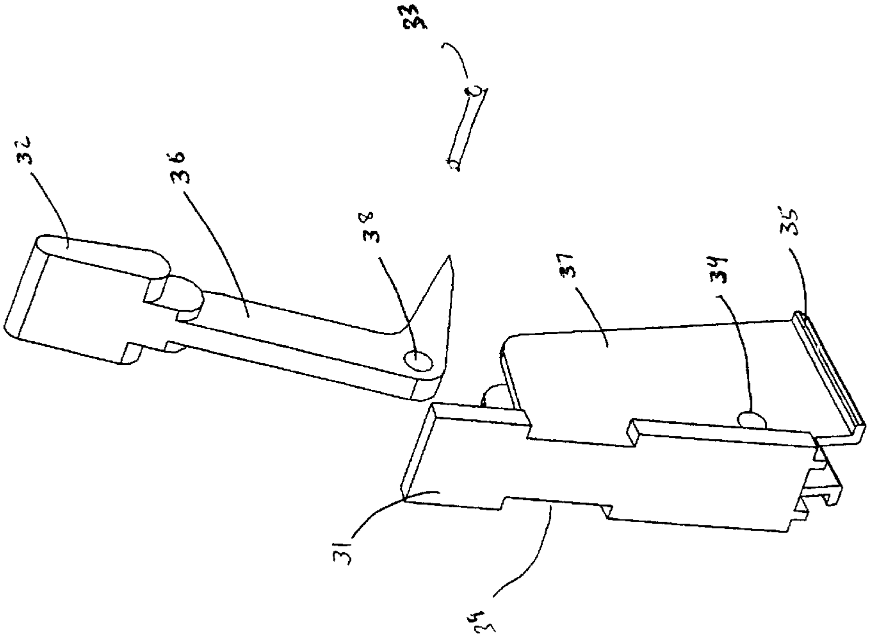
FIG. 10 is an exploded view of a third embodiment of the automatic product advance mechanism for dispensing merchandise on vending machines in accordance to the disclosed invention.

FIGS. 1 and 8 and FIG. 10 a third embodiment of the disclosed invention show on detailed the support carrier back-sled 30. FIG. 8 shows the pawl 36 engaged to the tooth 21 of actuator ratchet 20. A shaft 33 that passes through holes 38 of pawl 36 and hole 34 located on the legs 37 of carrier back-sled 30 joins both parts previously described. The diameter of holes 34 and 38 are slightly larger then the diameter of the shaft 39 purposely to allow pawl 36 to rotate. Pawl 36 has an extended neck with an attached head 32 means to be pulled towards the back of plate 31 in order to release pawl 36 from ratchet 20 teeth 21. The support carrier back-sled 30 is positioned between the dividers 40 and 41 and slides forward from back 54 to front 50 inside grooves 11 of base-rack 10 pushed by the engagement of the pawl 36 on actuator ratchet 20 teeth 21 when driven by the activation of the system. To reload products 100 on base-rack 10, one needs to manually retract support carrier back-sled 30 by holding carrier back-sled 30 from the top using one finger to pull head 32 towards the back of plate 31 and placing thumb on front of plate 31 and pushing towards the back 54 of base-rack 10.

The support carrier back-sled 30 as shown in FIG. 10, includes a pair of legs 37 with one base 35 each to slide inside groove 11 of base-rack 10. Each leg 37 is positioned upwardly joint by a front plate 31 that supports products 100 placed on top of base-rack 10 and in between column dividers 40 and 41. The support plate 31 has on each side a cut 39, leveling the side of support plate 31 with each leg 37, means to clear passage of an adjacent rail mounted to column dividers 40 or 41 positioned from front to back parallel to column dividers 40 or 41 with the purpose of orienting and guiding products 100 that presents smaller width in comparison with support plate 31. The support plate 31 is positioned at an angle greater than 90°, preferably approximately 102°, with respect to the base 35. Consequently the support plate 31 will be leaning towards the back of base-rack 10.

The disclosed dispensing mechanism functions more effectively when products 100 are loaded on top of base-rack 10 and in between columns dividers 40 or 41 supported by support carrier back-sled 30 in such a way that minimum airspace is allowed.

Figure 13:
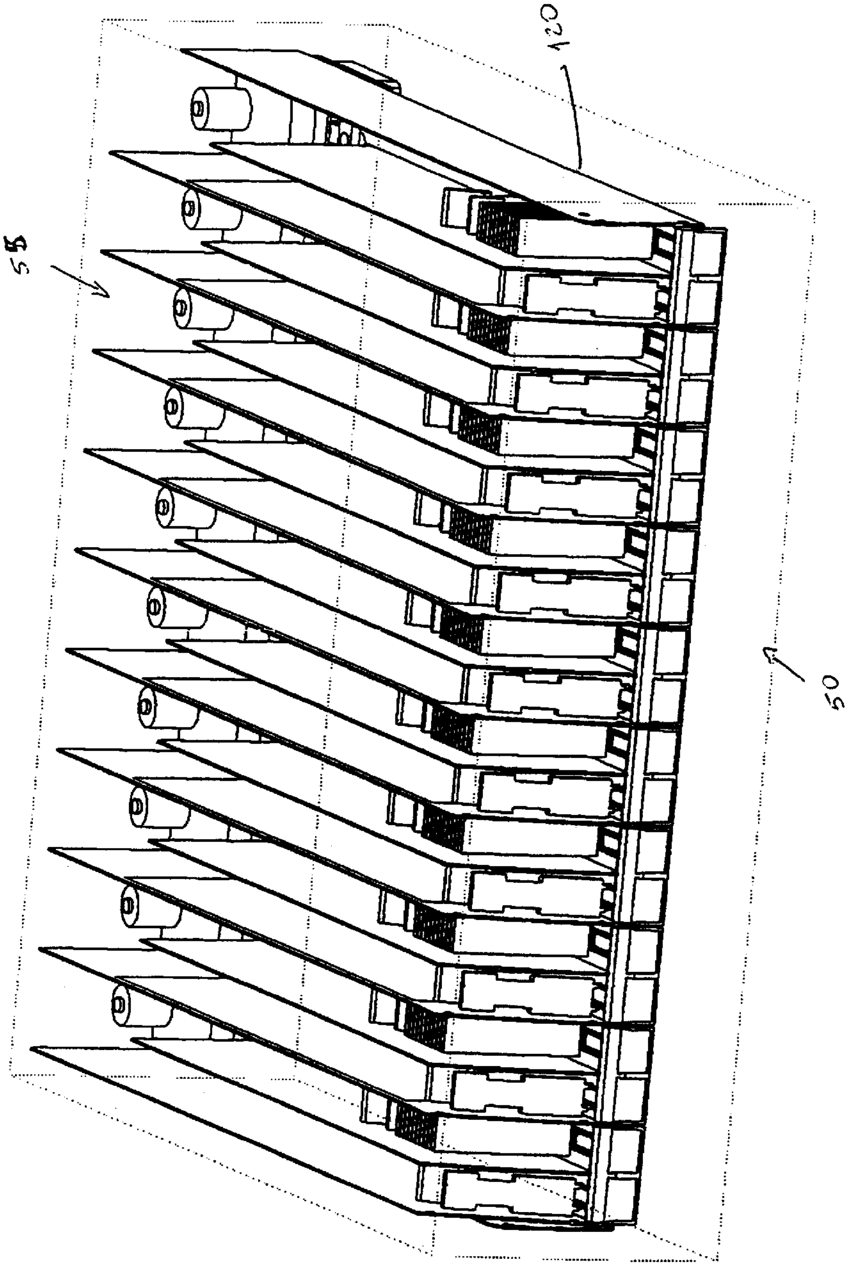
FIG. 13 is a perspective view of a retrofit shelf for vending machines containing units of the automatic product advance mechanism assembled on top of a metal structure in accordance to the disclosed invention.

FIG. 13 illustrates retrofit shelf 120 with ten base-racks 10 installed along with the other parts of the dispensing mechanism unit previously described of the disclosed invention forming a twenty-selection vending machine shelf.

The disclosed invention presents as its main advantage the combination of mechanical and electronic functions that enables the described dispensing mechanism to automatically adjust in accordance with various packages thickness categorizing such invention as a universal dispensing system.

While the invention has been described in connection with a preferred embodiment, it is not intended to limit the scope of the invention to the particular form set forth, but, on the contrary, its purpose is to cover such alternatives, modifications, and equivalents as many be included within the spirit and scope of the invention as defined by the following claims.

What I claimed is:

1. An automatic product advance mechanism for dispensing single merchandise on vending machines shelves utilizing a combination of electronic and mechanical components that enables the disclosed system to automatically adjust for dispensing different product packages formats and dimensions, said advance dispensing mechanism comprising of:

at least one base-rack means to load a row of products to be dispensed escorted by two abutted side column dividers positioned upwardly on each side of said base-rack or in between said row of products extending from the front to the back of said base-rack, wherein said base-rack has on each side a step-rail and one groove in the middle all positioned longitudinal to said base-rack wherein said column dividers is placed to slide along;

two sliding support carrier back-sled positioned upwardly on a 102° angle in relation with the surface of said base-rack, means to hold the products loaded on the said base-rack in between said column dividers on an upward position facing the front of the said base-rack, and two actuator ratchets sliding forward and back each inside a two built-in channels positioned flat and on each side of said base-rack, means to move forward and back said column dividers and push forward said support carrier back-sled driven by the activation of a gear motor that operates a crank-slider mechanism assembly.

2. The automatic product advance dispensing mechanism of claim 1 wherein said column dividers are connected to said actuator ratchet.

3. The automatic product advance dispensing mechanism of claim 1 wherein said base-rack means to accommodates many products of different shapes and sizes placed upwardly on said base-rack and in between said column dividers and supported by said carrier back-sled.

4. The automatic product advance dispensing mechanism of claim 1 wherein said support carrier back-sled slides along the said base-rack on a groove adjacent and substantially parallel to the said built-in channels of said actuator ratchets.

5. An automatic product advance mechanism for dispensing single merchandise on vending machines shelves utilizing a combination of electronic and mechanical components that enables the disclosed system to automatically adjust for dispensing different product packages formats and dimensions, said advance dispensing mechanism comprising of:

at least one base-rack means to load a row of products to be dispensed escorted by two abutted side column dividers positioned upwardly on each side of said base-rack or in between said row of products extending from the front to the back of said base-rack, wherein said column dividers are integral with a clear gate-shield device positioned at right angle perpendicular to the front of said column divider, means to secure and hold the first product loaded from falling off said base-rack when said gate-shield is on close position; and two sliding support carrier back-sled positioned upwardly on a 102° angle in relation with the surface of said base-rack, means to hold the products loaded on said base-rack in between said column dividers on an upward position facing the front of said base-rack, wherein each said support carrier back-sled has a pivoted pawl located on the back of said support carrier back-sled, means to engage by gravity to the teeth of said actuator ratchet; and two actuator ratchets sliding forward and back each inside a two built-in channels positioned flat and on each side of said base-rack, means to move forward and back said column dividers and push forward said support carrier back-sled driven by the activation of a gear motor and a crank-slider mechanism assembly, wherein said gear motor rotates said crank-slider mechanism using a shaft mounted at one end to the bore of said gear motor and the other end to said crank leverage arm on said crank-slider mechanism pivot point.

6. The automatic product advance dispensing mechanism of claim 5 wherein said clear gate-shield device is parallel and slanted equally to said support carrier back-sled.

7. The automatic product advance dispensing mechanism of claim 5 wherein said each support carrier back-sled includes a plate connected to two extended legs perpendicular to said plate and substantially parallel to each other with two feet wherein said feet means to slide inside said grooves, means to slide smoothly and restrain said support carrier back-sled to said base-rack grooves.

8. The automatic product advance dispensing mechanism of claim 5 wherein said pawl pivoted to each said support carrier back-sled is design on a L-shape format intentionally wherein the longer part of said pawl is placed upwardly and diagonal to the back of the plate of said support carrier back-sled and has an attached wider part at the end, means to release said pivoted pawl from the engagement with the said actuator ratchet teeth when pulled towards the direction of said back plate.

9. The automatic product advance dispensing mechanism of claim 5 wherein said crank leverage arm is pivot ably connected to an extended linkage arm, means to increase said actuator ratchet stroke.

10. The automatic product advance dispensing mechanism of claim 9 wherein said extended linkage arm is pivot ably connected to said slider on said crank-slider mechanism.

11. The automatic product advance dispensing mechanism of claim 10 wherein said slider is fastened to said ratchet, means to drive said ratchet when crank-slider mechanism assembly is activated.

12. An automatic product advance mechanism for dispensing single merchandise on vending machines shelves utilizing a combination of electronic and mechanical components that enables the disclosed system to automatically adjust for dispensing different product packages formats and dimensions, said advance dispensing mechanism comprising of:

at least one base-rack means to load a row of products to be dispensed escorted by two abutted side column dividers positioned upwardly on each side of said base-rack or in between said row of products extending from the front to back of said base-rack, wherein said column dividers are interchangeable on said side step-rails and said middle groove on said base-rack according to the width of the packages of products loaded on said base-rack;

two sliding support carrier back-sled positioned upwardly on a 102° angle in relation with the surface of said base-rack, means to hold the products loaded on said base-rack in between said column dividers on an upward position facing the front of said base-rack, wherein said support carrier back-sled pawl when engaged with the teeth of said actuator ratchet, means to push products towards the front end of said base-rack with the purpose of dispensing the first product loaded; and two actuator ratchets sliding forward and back each inside a two built-in channels positioned flat and on each side of said base-rack, means to move forward and back said column dividers and push forward said support carrier back-sled driven by the activation of a gear motor and a crank-slider mechanism assembly, wherein said gear motor shaft is fastened to said crank leverage arm on a pivot point positioned off from the center of said crank leverage arm on said crank-slider mechanism, means to effect an eccentric revolution to said crank leverage arm when activated by said gear motor.

13. The automatic product advance dispensing mechanism of claim 12 wherein said column dividers are connected to said actuator ratchets on the back end of said base-rack by a bracket, means to move along with said actuator ratchets when system is activated.

14. An automatic product advance mechanism for dispensing single merchandise on vending machines shelves utilizing a combination of electronic and mechanical components that enables the disclosed system to automatically adjust for dispensing different product packages formats and dimensions, said advance dispensing mechanism comprising of:

at least one base-rack means to load a row of products to be dispensed escorted by two abutted side column dividers positioned upwardly on each side of said base-rack or in between said row of products extending from the front to the back of said base-rack, wherein said base-rack at the front end has an attachable front-unit making a 30°0 angle ramp with a immediately round end droop, means to ease the downfall of first product to be dispensed;

two sliding support carrier back-sled positioned upwardly on a 102° angle in relation with the surface of said base-rack, means to hold the products loaded on said base-rack in between said column dividers on an upward position facing the front of said base-rack, and two actuator ratchets sliding forward and back each inside a two built-in channels positioned flat and on each side of said base-rack, means to move forward and back said column dividers and push forward said support carrier back-sled driven by the activation of a gear motor and the operation of a crank-slider mechanism, wherein said support carrier back-sled when driven forward by the engagement of said pawl to said actuator ratchet teeth, said support carrier back-sled advances and simultaneously opens said gate-shield, wherein the first product loaded on said base-rack falls off said base-rack passing through an optical sensor beam.

15. The automatic product advance dispensing mechanism of claim 14, wherein said attachable front-unit has an extended facade, means to attaché labels to identify rows and columns on the shelves, as well as to place price tags for products been vended.

16. The automatic product advance dispensing mechanism of claim 14, wherein said optical sensor beam when activated sends a signal to an interface circuit board that is programmed to reverse the revolution of said gear motor, means to pull back said actuator ratchet to home position and simultaneously close said clear gate-shield, Said interface circuit board electronically commands the described system functionalities and operations, and is design to be compatible with most controller boards installed at existing vending machines on the market.

17. The automatic product advance dispensing mechanism of claim 14, wherein said actuator ratchet when pulled towards the back of said base-rack said gear motor shuts off due to the activation of a built-in limit switch on said gear motor.

* * * * *